United States Patent
Lee et al.

(10) Patent No.: US 7,184,910 B2
(45) Date of Patent: Feb. 27, 2007

(54) METHOD OF COMPENSATING SENSOR DATA AND EVALUATING AN INTERLOCK OF AN INTERLOCK SYSTEM

(75) Inventors: Seung-jun Lee, Seoul (KR); Hak-yong Kim, Suwon-si (KR); Yoo-seok Jang, Seoul (KR); Chang-hun Park, Hwaseong-si (KR); Seung-Yong Doh, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/196,351

(22) Filed: Aug. 4, 2005

(65) Prior Publication Data

US 2006/0086172 A1  Apr. 27, 2006

(30) Foreign Application Priority Data

Oct. 22, 2004  (KR) ............... 10-2004-0084757

(51) Int. Cl.
*G01L 27/00*  (2006.01)

(52) U.S. Cl. ............... 702/104; 702/85; 702/116; 73/1.01; 73/1.88; 73/1.34; 438/16; 438/17; 324/225

(58) Field of Classification Search ............... 702/104, 702/85, 116; 324/105, 225; 438/16, 17; 73/649, 1.01, 1.88, 1.34
See application file for complete search history.

(56) References Cited

U.S. PATENT DOCUMENTS

| | | | | |
|---|---|---|---|---|
| 5,978,743 A | * | 11/1999 | Kiyono | ............ 702/86 |
| 6,486,661 B2 | * | 11/2002 | Chia et al. | ........... 324/225 |
| 6,577,976 B1 | * | 6/2003 | Hoff et al. | ............ 702/95 |
| 6,712,265 B2 | | 3/2004 | Kuo et al. | |
| 6,850,859 B1 | * | 2/2005 | Schuh | ............ 702/104 |

FOREIGN PATENT DOCUMENTS

| | | |
|---|---|---|
| KR | 1999-74696 | 10/1999 |
| KR | 2004-14072 | 2/2004 |
| KR | 2004-24793 | 3/2004 |

* cited by examiner

*Primary Examiner*—John Barlow
*Assistant Examiner*—Hien Vo
(74) *Attorney, Agent, or Firm*—Stanzione & Kim, LLP

(57) ABSTRACT

A method of compensating sensor data and a method of evaluating an interlock of an interlock system, in which an allowable variation between sensors varying depending on a driving time for a set of equipment, an RF time, the number of wafers, etc. is minimized, thereby enhancing detection reliability of a defective wafer.

43 Claims, 6 Drawing Sheets

FIG. 4

| SAMPLE POINT / WAFER NO. | STEP1 | | | STEP2 | | STEP3 | | | | STEP4 |
|---|---|---|---|---|---|---|---|---|---|---|
| | 1 | 2 | 3 | 4 | 5 | 6 | 7 | 8 | 9 | 10 |
| 1 | o | o | o | o | x | o | o | x | x | o |
| ... | o | x | o | o | o | o | o | o | o | o |
| N | x | x | o | o | o | o | o | o | x | o |
| #SAMPLES | 2 | 1 | 3 | 3 | 2 | 3 | 3 | 2 | 1 | 3 |
| RF | Σ/2 | Σ/1 | Σ/3 | Σ/3 | Σ/2 | Σ/3 | Σ/3 | Σ/2 | Σ/1 | Σ/3 |

|  | S1 | S2 | S3 | ... | Sm |
|---|---|---|---|---|---|
| P1 | d(1,1) | d(1,2) | d(1,3) | ... | d(1,m) |
| P2 | d(2,1) | d(2,2) | d(2,3) | ... | d(2,m) |
| P3 | d(3,1) | d(3,2) | d(3,3) | ... | d(3,m) |
| ... | ... | ... | ... | ... | ... |
| Pn | d(n,1) | d(n,2) | d(n,3) | ... | d(n,m) |

METHOD OF COMPENSATING SENSOR DATA AND EVALUATING AN INTERLOCK OF AN INTERLOCK SYSTEM

CROSS-REFERENCE TO RELATED APPLICATIONS

This application claims the benefit of Korean Patent Application No. 2004-84757, filed on Oct. 22, 2004 in the Korean Intellectual Property Office, the disclosure of which is incorporated herein in its entirety by reference.

BACKGROUND OF THE INVENTION

1. Field of the Invention

The present general inventive concept relates to a method of compensating sensor data and evaluating an interlock of an interlock system, and more particularly, to a method of compensating sensor data and evaluating an interlock of an interlock system, in which the interlock is properly secured by accounting for a drift offset and/or a shift offset of the sensor data.

2. Description of the Related Art

In a semiconductor fabricating process, a process of fabricating each unit costs a great deal, and quality and productivity of a semiconductor are affected by a state of fabricating equipment. Therefore, problems with the fabricating equipment should be detected early in order to prevent a defective wafer from being produced and to prevent resources from being wasted. Detecting problems early helps to reduce a production cost and enhance a production yield In order to detect problems with the fabricating equipment in the semiconductor fabricating process, a conventional method of analyzing past data by comparing the past data to a preset range value has been used.

However, various sets of identical equipment used in the semiconductor fabricating process are likely to continuously vary in their characteristics according to each process that is performed. Further, even though the identical sets of equipment may have identical settings, a variation and/or a deviation may arise between the identical sets of equipment.

In order to accurately determine whether the sets of equipment are functioning properly, a user has to occasionally correct and input the variation and/or the deviation. However, this is impractical. In particular, a method of compensating reference information for a periodic parameter and a method of evaluating the identical sets of equipment are needed. Accordingly, a conventional interlock system has been developed and used with the semiconductor fabricating process, wherein the interlock system instantly checks the reference information in real time and automatically updates the reference information according to a current situation of the semiconductor fabricating process.

The conventional interlock system is operated according to the reference information, which is previously set by a user. However, the interlock system cannot account for a variation in sensor information from various sensors that vary as the process is performed, or an internal variation in the sets of equipment. Thus, a problem arises in that it is difficult to account for an accidental difference between the sets of equipment. Therefore, the reference information for the respective sets of equipment needs to be individually set. This takes much time and expense.

Further, in the conventional interlock system, even though the sets of equipment are identical, it is difficult to account for the variation that arises as time goes by, so that a false alarm is likely to be raised. To reduce the likelihood of the false alarm, an allowable variation should be expanded. However, when the allowable variation is expanded, it is difficult to detect problems with some of the sensors.

SUMMARY OF THE INVENTION

Accordingly, the present general inventive concept provides a method of compensating sensor data and a method of evaluating an interlock of an interlock system, in which interlock setting/managing for identical sets of equipment under the interlock system is simplified through a statistic drift compensation algorithm, and an allowable variation between wafers is minimized, thereby enhancing detection reliability of a defective wafer.

The general inventive concept provides a method of compensating sensor data and a method of evaluating an interlock of an interlock system, in which an allowable variation between sensors varying depending on a driving time for a set of equipment, an RF time, a number of wafers, etc. is minimized, thereby enhancing detection reliability of a defective wafer.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of compensating sensor data used in an interlock system, the method comprising setting a predetermined drift upper limit and a predetermined drift lower limit, creating reference pattern information about a reference model, creating sensor pattern information about the sensor data, determining whether the sensor pattern information satisfies the drift upper limit and the drift lower limit, calculating a drift offset according to the reference pattern information and the sensor pattern information when the sensor pattern information satisfies the drift upper limit and the drift lower limit, and compensating the sensor data according to the calculated drift offset.

The creating of the reference pattern information about the reference model may comprise setting a plurality of sample points each corresponding to at least one wafer, calculating a representative value for each of the respective sample points, calculating a standard deviation of each sample point according to a maximum value and a minimum value at each sample point, and calculating a managing range of each sample point according to the representative value of each of the respective sample points and the standard deviation of each sample point.

The calculating of the standard deviation of each sample point may comprise calculating a range value of each sample point according to the maximum value and the minimum value at each sample point, calculating an average value of the range values for the plurality of sample points, and calculating a standard deviation of the plurality of sample points according to the average value of the range values and a predetermined coefficient.

The representative value for each of the respective sample points may include an average value of the sensor data at each sample point.

The creating of the sensor pattern information may comprise dividing the sensor data according to a unit corresponding to the sample point, and calculating the representative value of the sensor data in the unit corresponding to the sample point.

The representative value of the sensor data may include an average value of the sensor data in the unit corresponding to the sample point.

The drift offset may be calculated on the basis of a deviation between the representative value of each of the respective sample points and the representative value of the sensor data.

The drift offset may be calculated with regard to each sample point.

The foregoing and/or other aspects and advantages of the present general inventive concept may also be achieved by providing a method of compensating sensor data used in an interlock system, the method comprising selecting a sensor for compensation, collecting the sensor data generated from the sensor selected for the compensation during a preventative maintenance cycle that occurs at predetermined times, clustering the sensor data into a plurality of time slots with respect to a unit of the preventative maintenance cycle, selecting one of the plurality of time slots as a reference time slot, calculating a shift offset about each of the plurality of time slots with respect to reference data of the reference time slot and data of the other ones of the plurality of time slots, and compensating the sensor data from the sensor selected for the compensation according to the calculated shift offset.

The sensor selected for the compensation may include a sensor having a sensor data that varies in a sensing range as a number of preventative maintenance cycles is increased.

The clustering of the sensor data into the plurality of time slots may comprise clustering the collected sensor data into the plurality of time slots by one of a clustering algorithm, a K-means method, a regression analysis model, a mathematical model, and an artificial neural network analysis.

The reference data of the reference time slot and the data of the other ones of the plurality of time slots may include an average value of the sensor data in each of the plurality of time slots.

The method may further comprise calculating a shift offset of a time slot having no sensor data through the regression analysis.

The method may further comprise inputting new sensor data during a new preventative maintenance cycle, determining whether the new sensor data matches the shift offset of a time slot corresponding to the new sensor data, and clustering the time slot corresponding to the new sensor data with respect to the new preventative maintenance cycle and calculating the shift offset of each of the plurality of time slots when the new sensor data does not match the shift offset of the time slot corresponding to the new sensor data and the time slot corresponding to the new sensor data does not have the shift offset.

The foregoing and/or other aspects and advantages of the present general inventive concept may also be achieved by providing a method of evaluating an interlock of an interlock system, the method comprising collecting sensor data, determining whether the interlock is generated according to the collected sensor data, compensating the collected sensor data by calculating a drift offset according to sensed pattern information for one or more sensors that collect the sensor data and reference pattern information when it is determined that the interlock is not generated, and determining whether the interlock is generated on the basis of the sensor data compensated according to the calculated drift offset.

BRIEF DESCRIPTION OF THE DRAWINGS

These and/or other aspects and advantages of the present general inventive concept will become apparent and more readily appreciated from the following description of the embodiments, taken in conjunction with the accompany drawings of which:

FIG. 4 is a table used to calculate the drift offset in the interlock system of FIG. 1;

FIG. 6 is a table illustrating a relation between a time slot and a wafer in the interlock system of FIG. 1.

DETAILED DESCRIPTION OF THE PREFERRED EMBODIMENTS

Figure 1:
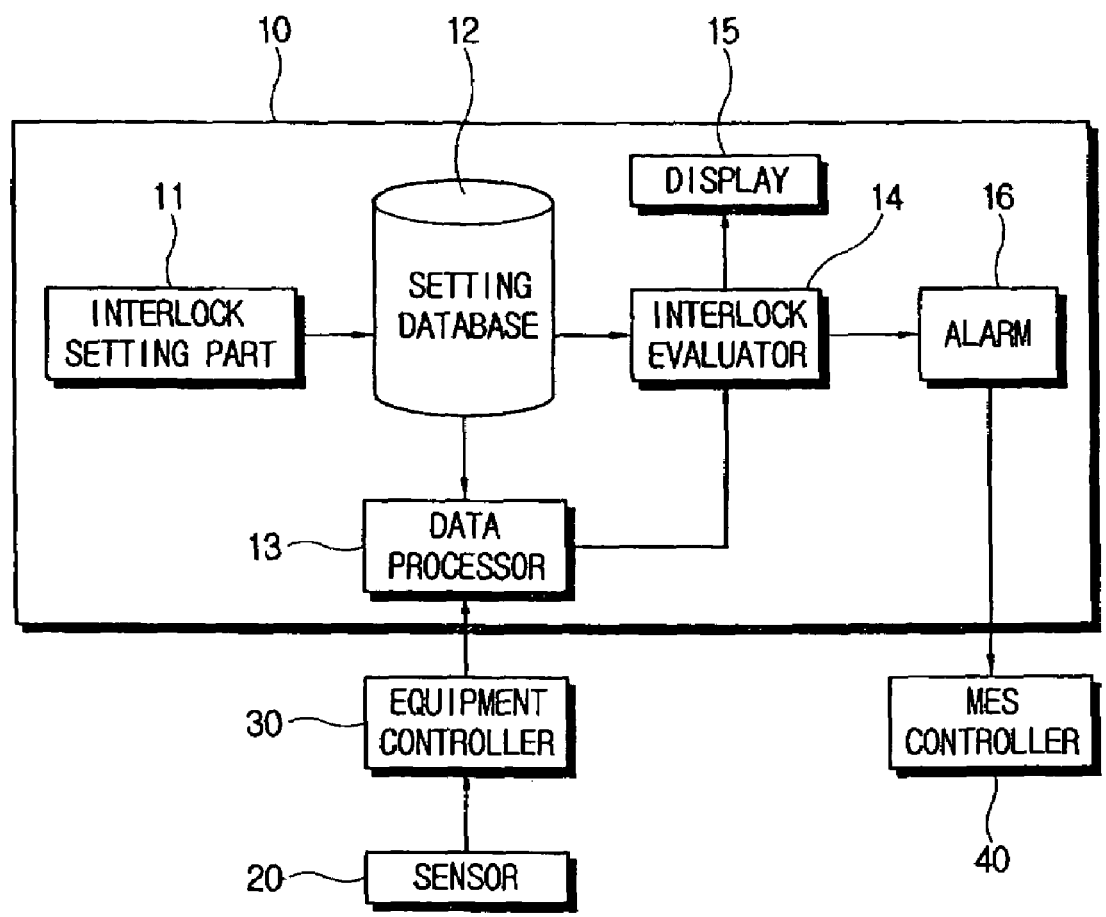
FIG. 1 is a control block diagram illustrating an interlock system according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a control block diagram illustrating an interlock system according to an embodiment of the present general inventive concept. As illustrated therein, the interlock system comprises a sensor 20, an equipment controller 30, a fault detection and classification (FDC) system 10, and a manufacturing execution system (MES) controller 40. Interlock in a semiconductor manufacturing process refers to a state in which one or more sets of equipment are processing semiconductor wafers within an acceptable range of parameters.

The sensor 20 may include a plurality of sensors and be installed in sets of semiconductor equipment in a semiconductor fabricating process, and outputs various sensor data.

The equipment controller 30 drives the sets of semiconductor equipment, and transmits initial sensor data sensed by the sensor 20 to the FDC system 10. The initial sensor data is to be used to determine predetermined pattern information of a reference model for the sensor 20 (described below).

As illustrated in FIG. 1, the FDC system 10 comprises an interlock setting part 11, a setting database 12, a data processor 13, an interlock evaluator 14, and an alarm 16.

The data processor 13 receives the initial set of sensor data from the equipment controller 30, and converts the initial set of sensor data to have a proper format for the FDC system 10, particularly, for the interlock evaluator 14. The sensor data processed by the data processor 13 is transmitted to the interlock evaluator 14.

The interlock setting part 11 receives parameter setting data that corresponds to the sensor 20 from a user. Here, the parameter setting data input through the interlock setting part 11 is stored in the setting database 12.

The parameter setting data input through the interlock setting part 11 includes a drift upper limit and a drift lower limit.

The interlock evaluator 14 compares the sensor data transmitted from the data processor 13 with the parameter setting data stored in the setting database 12, thereby determining whether an interlock is generated or not. When the interlock is not generated in a set of the semiconductor equipment, the interlock evaluator 14 informs the alarm 16 that the interlock is generated.

The alarm 16 informs a user that the interlock not is generated, through various methods when the alarm 16 receives information about the non-generation of the interlock from the interlock evaluator 14. The alarm 16 may obtain characteristic information about the non-generation of the interlock and inform the MES controller 40 that the interlock is not generated, when the alarm 16 receives the information about the non-generation of the interlock from the interlock evaluator 14. For example, when it is determined that a specified set of equipment should be stopped from operating according to the information about the non-generation of the interlock, the alarm 16 informs the MES controller 40 of this information, thereby allowing the MES controller 40 to stop the specified set of equipment from operating.

In FIG. 1, a display 15 displays a picture corresponding to the information to inform a user of evaluation results from the interlock evaluator 14. The display may include a display apparatus such as a monitor.

Figure 2:
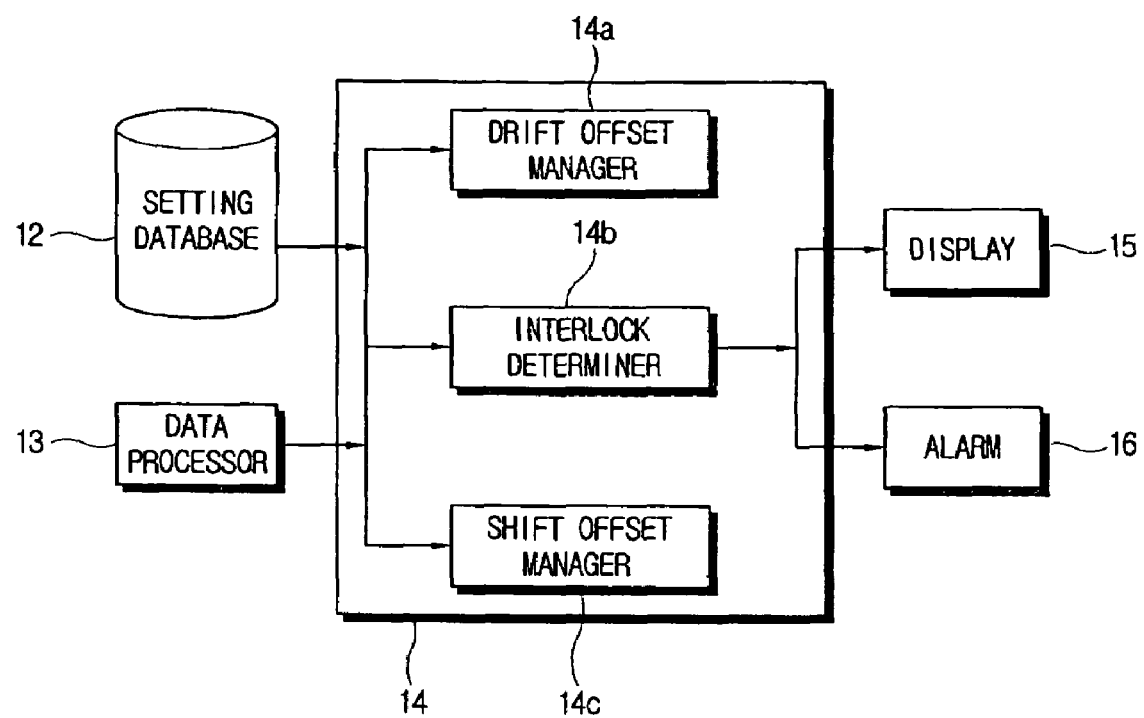
FIG. 2 is a control block diagram illustrating an interlock evaluator of the interlock system of FIG. 1.

FIG. 2 is a control block diagram illustrating the interlock evaluator 14 of FIG. 1 according to an embodiment of the present general inventive concept. As illustrated therein, the interlock evaluator 14 comprises a drift offset manager 14a, a shift offset manager 14c, and an interlock determiner 14b.

The drift offset manager 14a calculates a drift offset for the sensor 20 according to a drift characteristic of the sensor 20. The drift characteristic is a tendency of a reference level of sensor data measured by the sensor 20 to vary (i.e., drift) from some expected value according to sets of equipment to which the sensor 20 is applied.

The shift offset manager 14c collects recipes having a shift characteristic, and data needed to evaluate the sets of equipment, and/or the sensor 20. The shift characteristic is a tendency of a reference level of sensor data measured by the sensor 20 to vary in time (i.e., shift) from some expected value according to the sensor 20 itself. According to the data collected, the shift offset manager 14c sets up the sensor 20 and a time slot, and calculates and updates a shift offset.

The interlock determiner 14b determines whether the interlock of the specified set of equipment is generated according to the drift offset of the drift offset manager 14a and/or the shift offset of the shift offset manager 14c, and the sensor data collected by the sensor 20.

Hereinbelow, a method of determining whether the interlock is generated or not according to the sensor data collected by the sensor 20 having the drift characteristic by the drift offset manager 14a and the interlock determiner 14b will be described with reference to FIG. 3.

Here, the sensor 20 having the drift characteristic refers to a sensor that may give rise to a false alarm when the interlock is determined by the sensor data based on a corresponding reference level because the corresponding reference level of the sensor 20 may vary according to sets of equipment even though the sensor 20 performs the same function in identical sets of equipment. For example, the sensor 20 may be an optical emission spectrometer value that senses a throttle value and the corresponding reference level may vary each time a sensing operation is performed, the corresponding reference level may vary in the identical sets of equipment, and the corresponding reference level may vary according to sensing operations between the sets of equipment.

First, at operation S10, a user sets/inputs the drift upper limit and the drift lower limit through the interlock setting part 11, wherein the drift upper limit and the drift lower limit are used as the parameter setting data for drift evaluation. Also at the operation S10, the set/input drift upper and lower limits are stored in the setting database 12. Here, the drift upper and lower limits can be set for the sensor 20 according to characteristics of the respective sets of equipment. The sensor 20 may include a plurality of sensors 20 to correspond to the respective sets of equipment and each of the plurality of the sensors may have its own drift characteristic.

Alternatively, the drift upper and lower limits can be set by the drift offset manager 14a. That is, the drift offset manager 14a previously calculates a deviation between the sets of identical equipment, and thus sets the drift upper and lower limits with regard to the corresponding sensor 20. Here, the sets of identical equipment indicate sets of equipment that use the same template information. The template information includes a list of each sensor 20, recipes registered in the sets of equipment, the characteristic information (evaluation method, a pattern model, etc.) of each sensor 20, a step sequence name including the recipe registered in the sets of equipment, and a number of samples for each step of the recipe registered in the sets of equipment.

Figure 3:
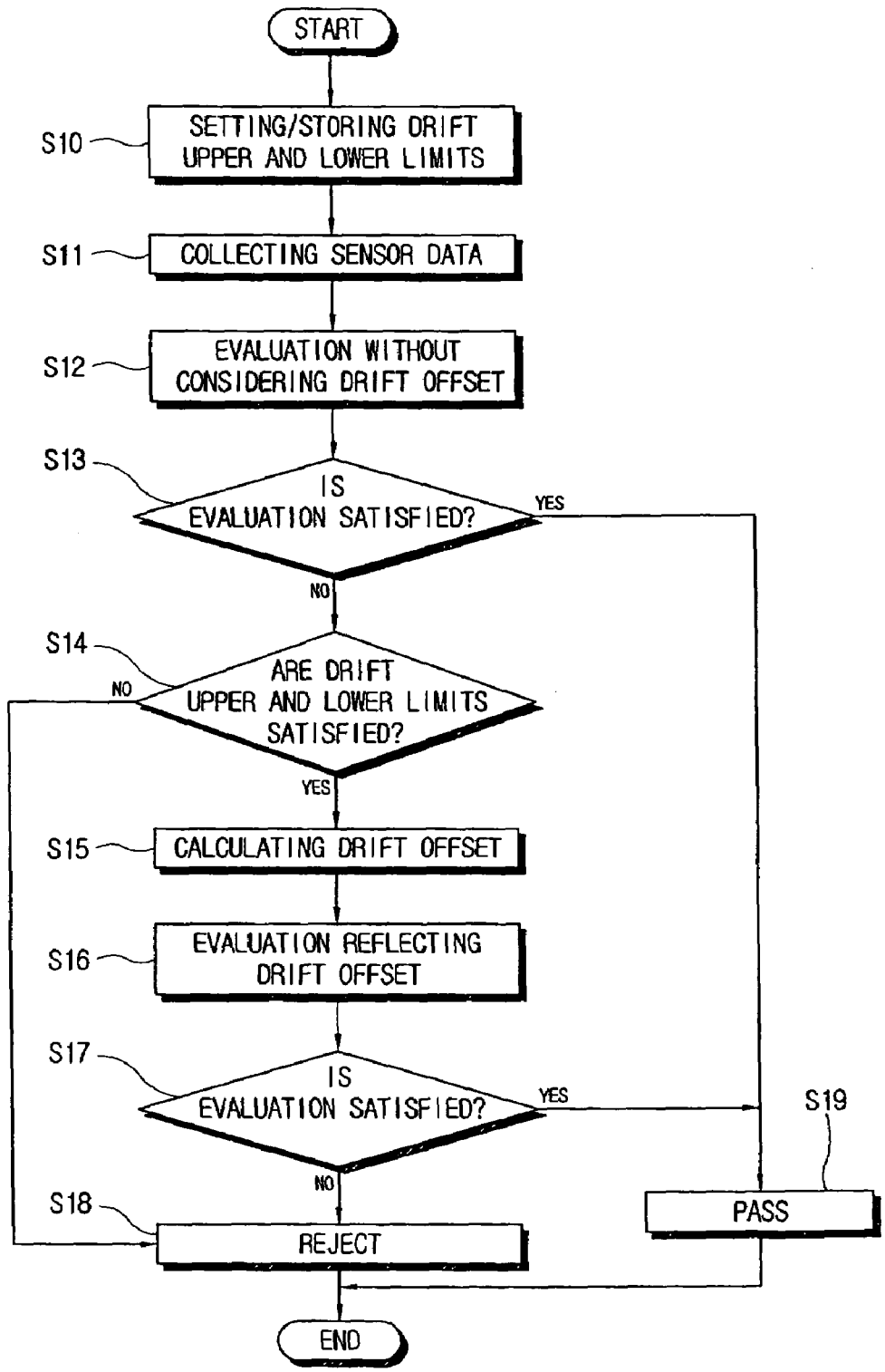
FIG. 3 is a control flowchart illustrating a method of evaluating an interlock using a drift offset in the interlock system of FIG. 1.

Referring to FIGS. 1 to 3, once the drift upper and lower limits are set and stored, at operation S11, the FDC system 10 receives the sensor data collected by the sensor 20 having the drift characteristic.

Then, at operation S12, the interlock evaluator 14 of the FDC system 10 evaluates the sensor data collected by the sensor 20 without considering the drift characteristic.

At operation S13, the evaluation of the sensor data collected by the sensor 20 is determined according to whether predetermined pattern information calculated according to a reference model is statistically similar to sensed pattern information based on the sensor data collected by the sensor 20 for the evaluation. Here, a statistical evaluation method between the two patterns can be performed by various methods, and an example thereof is as follows.

Prior to the evaluation of the sensor data collected by the sensor 20, a process of calculating the predetermined pattern information according to the reference model will be described first. Here, the predetermined pattern information including one or more recipe steps for a unit to be fabricated on a wafer will be described. For example, FIG. 4 illustrates a process of creating the predetermined pattern information including four recipe steps. FIG. 4 includes sample points 1 through 10 that correspond to wafers 1 through N.

A plurality of lots including one or more wafers on which an operation is performed are selected using the recipe designated in the sets of identical equipment and a plurality of bins. For each of the plurality of lots, a predetermined number of proper wafer information are selected. At this time, the wafers have the same position and the same sequence regardless of the plurality of lots.

Then, an active recipe step to be used as the reference model is determined, and a number of standard sample point values for each recipe step are determined. When template setting is completed, individual sample points of each recipe step are processed as follows.

First, the initial sensor data is measured by the sensor 20 for the plurality of lots of wafers to be used to create the predetermined pattern information of the reference model. Each of the plurality of lots of wafers may be processed by a corresponding set of identical equipment, and each corresponding set of equipment may have a sample point associated therewith. A representative value of each sample point of the initial sensor data is determined. Here, an average value of the corresponding sensor data collected by the sensor 20 for each of the plurality of lots of wafers is used as the representative value of each sample point (refer to "RF" of FIG. 4). Then, a range of each of the plurality of lots is calculated with reference to a maximum value and a minimum value of each of the plurality of lots. Further, an average value of the range for each lot is calculated. Each of the plurality of lots corresponds to a sample point and FIG. 4 illustrates ten lots.

Further, standard variation is estimated using a predetermine coefficient. Here, the predetermined coefficient is selected to change an estimation into an unbiased estimation. As to the predetermined coefficient selection, refer to the following literatures: 'Kim In sung, "Statistical Quality Control," Parkyungsa, 1989,' 'D. Montgomery, "Introduction to Statistical Quality Control," $4^{th}$ ed., November, 2000,' etc.

Further, a managing upper limit and a managing lower limit of each of the plurality of sample points (i.e., that correspond to the plurality of lots) are calculated using the average value and the standard variation of each of the plurality of sample points. Further, a managing range is set according to the managing upper and lower limits of each of the plurality of sample points. Then, information about the managing range set by the foregoing method is stored in the setting database 12.

A process of evaluating the sensor data collected by the sensor 20 using the information about the managing range set by the foregoing method is as follows.

When using the information about the managing range, each of the plurality of sample points refers to an independent control chart. According to an embodiment of the present general inventive concept, each of the plurality of sample points of the sensor data collected by the sensor 20 is matched with the plurality of sample points of the predetermined pattern information of the reference model, and each of the plurality of sample points of the sensor data is evaluated by the same method used in evaluating the initial sensor data used to create the predetermined reference pattern corresponding to each of the plurality of sample points.

For example, the sensor data corresponding to a sample point of "A" in FIG. 4 is used in determining whether the corresponding sensor data matches the set managing range information or not according to a significance level designated depending on a distribution represented at the corresponding sample point. Here, the average value of the sensor data at the sample point "A" can be used as a representative value of the sensor data at the sample point "A."

Thus, sensor data for each of the plurality of sample points is evaluated, and the evaluation of the sensor data at each of the plurality of sample points results in either a pass or a rejection according to whether the representative value of the sensor data at the corresponding sample points fall within the managing range. This evaluation produces the same result as an independent trial evaluation having binomial distribution.

Accordingly, after evaluating the sensor data at each of the plurality of sample points, the evaluation of the sensed pattern information of a specified one of the sensors 20 is generally performed according to the significance level, and uses a normal approximation method of the binomial distribution to perform the evaluation according to normal distribution. Here, when the evaluation results in the rejection of more than a predetermined number of sample points at a particular sample position, all of the sensor data of the specified one of the sensors 20 is rejected at the operation S13 (refer to FIG. 3).

Referring to FIG. 4, the number of total recipe steps is four, and the number of sample points is ten. Here, the determinations to sort out the passing and the rejected sensor data at the corresponding sample points are performed for every sample point, so that the determinations are sequentially performed ten times. In a semiconductor fabricating process, a number of sample points may be set to be greater than one hundred, so that the estimation of continuous binomial distribution is approximated to the normal distribution. For example, in a case where ten sample points among two hundred sample points are calculated by the significance level, the estimation to sort out the passing and the rejected sensor data at the corresponding sample points is performed for the two hundred sample points, and then the estimation results in a rejection when five or more representative values of the sensor data at the sample points are beyond the managing upper limit or the managing lower limit (i.e., the managing range).

Referring back to FIG. 3, when the sensor data collected by the sensor 20 is determined as passing at the operation S13, at operation S19 the interlock determiner 14b determines that the interlock is generated.

On the other hand, when the sensor data is determined to be rejected at the operation S13, at operation S14, the drift offset manager 14a reads out the drift upper limit and the drift lower limit of the corresponding sensor 20 stored in the setting database 12, and determines whether the sensor data collected by the sensor 20 is included between the drift upper limit and the drift lower limit. Here, to determine whether the sensor data is included between the drift upper limit and the drift lower limit, an estimation is performed with a unit of individual sensor data for a corresponding lot (i.e., sample point), or performed with the average value of the corresponding lot.

Here, when the sensor data is included between the drift upper limit and the drift lower limit, at operation S15 the drift offset manager 14a calculates the drift offset according to the sensor data.

The drift offset manager 14a calculates the drift offset with regard to each of the plurality of lots according to an average difference between the predetermined pattern information of the reference model and the sensed pattern information of the sensor data. Here, when the drift offset manager 14a calculates the drift offset, the drift offset is calculated to exclude a maximum a % of the sensor data and a minimum a % of the sensor data because under/over estimation may arise due to hunting or a sampling fault of the sensor data.

Further, at operations S16, S17, S18, and S19, the interlock determiner 14b accounts for the calculated drift offset in the sensor data, and determines whether the interlock is generated or not according to the passing or the rejection that results from the estimation method at the foregoing operation S12 based on the sensor data to which the drift offset accounted for.

The method of evaluating the interlock using the drift offset illustrated in FIG. 3 first sets the drift upper and lower limits at operation S10. The drift upper and lower limits may be set by a user or the drift offset manager 14a (FIG. 2). Sensor data from one or more sensors and/or one or more sets of equipment is then collected and evaluated according to the predetermined pattern information set using the initial the sensor data. Representative values of the sensor data at a plurality of sample points are compared to representative values and ranges of the pattern reference information at the corresponding sample points. If the representative value of the sensor data at a sample point falls within the representative range for the corresponding sample point, the sensor data of the corresponding sample point is passed. If the representative value of the sensor data at the sample point falls outside the representative range for the corresponding sample point, the sensor data of the corresponding sample point is temporarily rejected. These steps are repeated for the sensor data at all the sample points to perform this initial evaluation without considering the drift characteristic at operations S12 and S13. The rejected sensor data is then re-evaluated at operations S14 through S18. At operation S14 the representative values of the rejected data at the corresponding sample points are compared to the drift upper and lower limits to determine whether the sensor data falls within therewithin. Operation S14 estimates the drift of the sensor data at the corresponding sample points, but does not actually calculate it. If the representative values of the sensor data do not fall between the drift upper and lower limits, the corresponding sensor data is finally rejected. If, on the other hand, the representative values of the sensor data do fall between the drift upper and lower limits, the drift offset of the sensor data at the corresponding sample points is calculated at operation S15. The drift offset is calculated by determining a difference between the representative values of the predetermined pattern information and the representative values of the sensor data at the corresponding sample points. The drift offset of the sensor data is compensated and evaluated to determine whether the sensor data at the corresponding sample points are passed or is rejected at operations S16, S17, S18, and S19. A state of interlock is generated when the sensor data. If the sensor data is rejected, the state of interlock is not generated and the interlock evaluator 14 notifies the display 15 and/or the alarm 16 (FIG. 2) of a specific sensor and/or set of equipment that is not producing data that matches the predetermined pattern information determined above.

As described above, the interlock setting/managing for the identical sets of equipment is simplified through the drift compensation algorithm, and the allowable variation between wafers is minimized, thereby enhancing detection reliability of a defective wafer.

Hereinbelow, a process of determining the sensor data as passing or rejected from the sensor 20 having the shift characteristic by the shift offset manager 14c will be described.

Here, the sensor 20 having the shift characteristic indicates a sensor that varies in a countable number range for wafers as a number of preventative maintenance (PM) cycles is increased, e.g., like a sensor counting the number of accumulatively produced wafers.

A process of calculating a shift offset according to an embodiment of the present general inventive concept will be described. The process of calculating the shift offset includes an initial calculation process and a shift offset updating process. The shift characteristic is a tendency of a reference level of sensor data measured by the sensor 20 to vary in time (i.e., shift) from some expected value according to the sensor 20 itself.

The initial calculation process for the shift offset is as follows. Here, the initial calculation process for the shift offset refers to a calculation process until the shift offset is set a predetermined ratio of time slots of a time span over which sensor data is collected. Here, the predetermined ratio of time slots refers to a ratio of a number of time slots having the calculated shift offset to a total number of time slots. Therefore, the initial calculation process is applied until the shift offset is calculated about for the predetermined number of time slots from a time when there is no time slot having the calculated shift offset.

First, at operation S30, a set of equipment, a process recipe, and the PM (preventative maintenance) sensor 20 are selected. Then, at operation S31, the PM sensor 20 having the shift characteristic (hereinbelow, referred to as "shift sensor") is selected from a list of the sensors 20 for the selected recipe.

At operation S32, the sensor data generated during a PM cycle that occurs at predetermined times is collected by the shift sensor 20.

At operation S33, the time span over which the sensor data is collected is divided with respect to a length of a single PM cycle according to the collected sensor data. According to an embodiment of the present general inventive concept, the time span is divided by a clustering algorithm.

The clustering algorithm can cluster a section estimated to statistically have the same data in a single PM cycle into the same time slot. For example, in a case where the data of a predetermined sensor ranges from 50 to 60 in 1~20 sections among 1~100 sections of the PM cycle and ranges 40 to 50 in 20~100 sections, the time span of the predetermined sensor is clustered into 1~20 sections and 20~100 sections.

Here, a process of clustering the time span using the clustering algorithm is as follows: an allowable reference variance, a maximum number of lots, and a minimum number of lots are set. Further, from a beginning point of when the shift sensor 20 begins collecting data, the section having the data and the section having no data are all set as individual time slots. The maximum and minimum number of lots refer to a maximum and minimum amount of data that can correspond to a time slot. Lots refers to one or more wafers that are processed and for which data is sensed by the shift sensor 20.

The following process is repeated for each time slot having data. First, a variation is calculated between each of the respective time slots. Then, when the calculated variation of the respective time slot is smaller than the allowable reference variation, the respective time slot is not divided any more and assigned as the time slot.

On the other hand, when the calculated variation of the time slot is larger than the allowable reference variation, the data of the corresponding time slot is decreased from the maximum number of lots to the minimum number of lots until the calculated variation is smaller than the allowable reference variation. Thus, the maximum number of lots of when the calculated variation of the time slot is smaller than the allowable reference variation is assigned for the time slot.

Besides the clustering algorithm, various methods such as a K-means method, a regression analysis model, a mathematical model, an artificial neural network, etc., can be used to divide the time span with respect to the single PM cycle.

Figure 5:
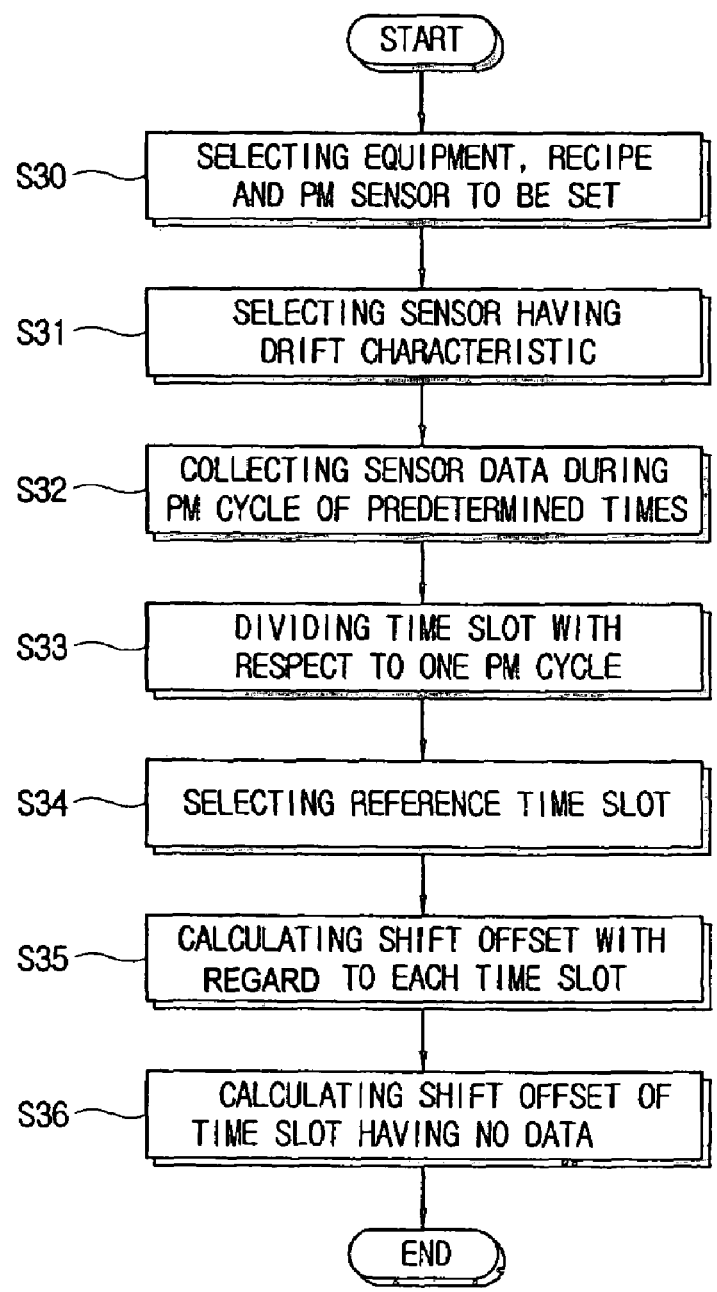
FIG. 5 is a control flowchart illustrating a method of calculating an initial shift offset in the interlock system of FIG. 1.

Referring to FIG. 5, at operation S34, a reference time slot to be used as reference information is selected from among M divided time slots. Here, the reference time slot can be selected by selecting the time slot having a shift offset of 0. Alternatively, the reference time slot can be selected by selecting the time slot that best represents a sensed pattern information of the shift sensor 20.

At operation S35, the shift offset is calculated for each time slot in the time span by comparing reference data of the reference time slot with data of each of the other M−1 time slots. Here, the shift offset of each of the other time slots is calculated by the difference between the reference data of the reference time slot and the data of the corresponding time slot. Further, the data of each of the other time slots may use an average of the sensor data included in each time slot.

At operation S36, the shift offset of a time slot having no sensor data is calculated according to a data of a time slot having the data and the shift offset calculated at the operation S35. Here, the shift offset of the time slot having no sensor data can be estimated by a fitting method such as a regression analysis using the calculated shift offset.

Then, the calculated shift offset of each time slot is stored in the setting database 12. In a case where a plurality of shift sensors 20 are selected at the operation S31, the calculated shift offset of each time slot may be stored in a table in the setting data base 12 in order to define the shift offsets between the plurality of shift sensors 20 and the time slots (refer to a table of FIG. 6).

Hereinbelow, the shift offset updating process will be described. Here, the calculated (i.e., newly calculated) shift offset is compared with the existing shift offset when new data is input during the PM cycle, and the shift offset is updated when a difference between the calculated shift offset and the existing shift offset is beyond a predetermined range. This process is as follows.

First, newly collected sensor data corresponds to a preset time slot as illustrated in FIG. 6. Then, it is determined whether the shift offset of the preset time slot matches the calculated shift offset of the newly collected sensor data.

Then, it is determined whether the new sensor data is collected within the time slot having no data. When the new sensor data is collected within the time slot having no data, it is determined whether the corresponding time slot having no data has the existing shift offset.

Here, the corresponding time slot has no shift offset, the whole PM cycle is divided into the time slots.

Further, the foregoing process is repeated until the check is performed with regard to all the time slots, and then the shift offset of each time slot is calculated.

The calculated/updated shift offset is used in a similar manner as the method of evaluating the sensor data to account for the drift offset. When evaluating the drift offset, the compensation is performed for each sample point when the sensor data of one wafer unit, i.e., raw data that is evaluated, so that the drift offsets are individually calculated according to the wafers when the wafer is evaluated. When evaluating the shift offset, the shift offsets are calculated according to the time slots, and each shift offset is previously calculated and stored in a table in the setting data base 12 (refer to FIG. 6). Further, table values about the shift offsets can be periodically changed or updated, but are not instantly calculated and reflected unlike the evaluation of the drift offset.

The method of calculating an initial shift offset in the interlock system illustrated in FIG. 5 collects data over a time spanning one or more PM cycles. The time span is divided into a plurality of time slots corresponding to the length of the PM cycles. Each of the plurality of time slots includes data collected by a specified sensor having an offset value that varies from time slot to time slot. In other words, as time elapses (i.e., more PM cycles occur), the offset value of the data included in the plurality of time slots shifts. The initial shift offset value is calculated for each of the plurality of time slots and stored so that during a semiconductor manufacturing process, a current offset value of current sensor data collected by the specified sensor can be compared with the stored initial offset value in order to determine whether the stored initial offset value needs to be updated.

As described above, the allowable variation between the sensors varying depending on a driving time for the equipment, an RF time, the number of wafers, etc. is minimized by the statistic drift compensation algorithm, thereby enhancing detection reliability of a defective wafer.

Thus, the interlock system according to an embodiment of the present general inventive concept is operated in real time, and corresponds to a mass-producing process operating a plurality of sets of equipment, so that an operating state can be checked using analysis information about the drift characteristic and/or the shift characteristic of a sensor.

Further, in the case where the preventative maintenance (PM) is periodically performed due to expendable components of the sets of equipment or due to the property of the equipment, the property of the equipment is checked with respect to the PM when it varies after, before, and around a point of the PM, thereby securing the identity of the equipment.

As described above, the present general inventive concept provides a method of compensating sensor data and a method of evaluating an interlock of an interlock system, in which interlock setting/managing for identical sets of equipment under the interlock system is simplified through a statistic drift compensation algorithm, and allowable variation between wafers is minimized, thereby enhancing detection reliability of a defective wafer.

Further, the present general inventive concept provides a method of compensating sensor data and a method of evaluating an interlock of an interlock system, in which allowable variation between sensors varying depending on a driving time for an equipment, an RF time, the number of wafers, etc. is minimized by the statistic drift compensation algorithm, thereby enhancing detection reliability of a defective wafer.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of compensating sensor data used in an interlock system which controls an interlock of manufacturing equipment, the method comprising:
    setting a drift upper limit and a drift lower limit;
    creating reference pattern information about a reference model;
    creating sensor pattern information about the sensor data;
    determining whether the sensor pattern information satisfies the drift upper limit and the drift lower limit;
    calculating a drift offset according to the reference pattern information and the sensor pattern information when the sensor pattern information satisfies the drift upper limit and the drift lower limit;
    compensating the sensor data according to the calculated drift offset; and
    controlling the interlock system to operate according to the compensated sensor data.

2. The method according to claim 1, wherein the creating of the reference pattern information about the reference model comprises:
    setting a plurality of sample points each corresponding to at least one wafer;

calculating a representative value for each of the respective sample points;
calculating a standard deviation of each sample point according to a maximum value and a minimum value at each sample point; and
calculating a managing range of each sample point according to the representative value of each of the respective sample points and the standard deviation of each sample point.

3. The method according to claim 2, wherein the calculating of the standard deviation of each sample point comprises:
calculating a range value of each sample point according to the maximum value and the minimum value at each sample point;
calculating an average value of the range values for the plurality of sample points; and
calculating a standard deviation of the plurality of sample points according to the average value of the range values and a predetermined coefficient.

4. The method according to claim 2, wherein the representative value for each of the respective sample points includes an average value of the sensor data at each sample point.

5. The method according to claim 2, wherein the creating of the sensor pattern information comprises:
dividing the sensor data according to a unit corresponding to the sample point; and
calculating the representative value of the sensor data in the unit corresponding to the sample point.

6. The method according to claim 5, wherein the representative value of the sensor data includes an average value of the sensor data in the unit corresponding to the sample point.

7. The method according to claim 5, wherein the drift offset is calculated on the basis of a deviation between the representative value of each of the respective sample points and the representative value of the sensor data.

8. The method according to claim 7, wherein the drift offset is calculated for each sample point.

9. The method according to claim 8, wherein the sensor pattern information includes sensor data for a plurality of identical sets of equipment performing a plurality of different processes on a plurality of wafers, and the drift offset includes an offset value for each of the plurality of identical sets of equipment as measured from the plurality of wafers being processed thereby.

10. The method according to claim 1, wherein the system comprises at least one set of equipment to process semiconductor wafers, and the sensor data comprises wafer data sensed by a sensor.

11. The apparatus according to claim 1, wherein the interlock system monitors operational information about the manufacturing equipment such that the manufacturing equipment is operated within a predetermined range of parameters according to operation of the interlock system.

12. A method of compensating sensor data used in an interlock system which controls an interlock of manufacturing equipment, the method comprising:
selecting a sensor for compensation;
collecting the sensor data generated from the sensor selected for the compensation during a preventative maintenance cycle that occurs at predetermined times;
clustering the sensor data into a plurality of time slots with respect to a unit of the preventative maintenance cycle;
selecting one of the plurality of time slots as a reference time slot;
calculating a shift offset about each of the plurality of time slots with respect to reference data of the reference time slot and data of each of the other ones of the plurality of time slots;
compensating the sensor data from the sensor selected for the compensation according to the calculated shift offset; and
controlling the interlock system to operate according to the compensated sensor data.

13. The method according to claim 12, wherein the sensor selected for the compensation includes a sensor having sensor data that varies in a sensing range as a number of preventive maintenance cycles is increased.

14. The method according to claim 12, wherein the clustering of the sensor data into the plurality of time slots comprises clustering the collected sensor data into the plurality of time slots by one of a clustering algorithm, a K-means method, a regression analysis model, a mathematical model, and an artificial neural network analysis.

15. The method according to claim 12, wherein the reference data of the reference time slot and the data of the other ones of the plurality of time slots include an average value of the sensor data in each of the plurality of time slots.

16. The method according to claim 12, further comprising:
calculating a shift offset of a time slot having no sensor data using a regression analysis.

17. The method according to claim 12, further comprising:
inputting new sensor data during a new preventative maintenance cycle;
determining whether the new sensor data matches the shift offset of a time slot corresponding to the new sensor data; and
clustering the time slot corresponding to the new sensor data with respect to the new preventative maintenance cycle and calculating the shift offset of each of the plurality of time slots when the new sensor data does not match the shift offset of the time slot corresponding to the new sensor data and the time slot corresponding to the new sensor data does not have the shift offset.

18. The method according to claim 12, wherein the sensor data is collected from one or more wafers processed by a specified set of equipment.

19. The method according to claim 12, wherein the interlock system comprises at least one set of equipment to process semiconductor wafers, and the sensor data comprises wafer data sensed by a sensor.

20. A method of evaluating an interlock of an interlock system, the method comprising:
collecting sensor data;
determining whether the interlock is generated according to the collected sensor data;
compensating the collected sensor data by calculating a drift offset according to sensed pattern information about the sensor data of one or more sensors and a reference pattern information, upon determining that the interlock is not generated; and determining whether the interlock is generated on the basis of the sensor data compensated according to the calculated drift offset.

21. A method of evaluating an interlock of an interlock system in a manufacturing system, the method comprising:
selecting a sensor for compensation;
collecting sensor data generated from the sensor selected for the compensation during a preventative maintenance cycle that occurs at predetermined times;

clustering the sensor data into a plurality of time slots with respect to a unit of the preventative maintenance cycle;

selecting one of the plurality of time slots as a reference time slot;

calculating a shift offset about each of the plurality of time slots according to reference data of the reference time slot and data of each of the other ones of the plurality of time slots;

compensating the sensor data from the sensor selected for the compensation according to the calculated shift offset;

determining whether the interlock is generated according to the compensated sensor data; and controlling the interlock system according to whether the interlock is generated in the manufacturing system.

22. A method of evaluating an interlock of an interlock system in a manufacturing system, the method comprising:

calculating a drift offset according to sensor data;

calculating a shift offset according to the sensor data;

compensating the sensor data according to the shift offset;

determining whether an interlock is generated according to the compensated sensor data and the calculated drift offset; and controlling the interlock system according to whether the interlock is generated in the manufacturing system.

23. The method according to claim 22, wherein the drift offset comprises a variation in a reference level of the sensor data from an expected reference level measured among a plurality of identical sets of equipment in a fabrication process.

24. The method according to claim 23, wherein the calculating of the drift offset comprises:

presetting a reference level for wafer data sensed by at least one sensor;

determining expected variations for the reference level for each of the plurality of sets of identical equipment; and collecting current wafer data during the fabrication process from a selected one or more sets of equipment using the at least one sensor and determining whether the reference level of the current wafer data matches the expected variations for the selected one or more sets of equipment.

25. The method according to claim 24, wherein the determining of whether the interlock is generated comprises determining whether to generate an interlock signal according to whether the reference level of the current wafer data matches the expected variations for the selected one or more sets of equipment.

26. The method according to claim 22, wherein the shift offset comprises a time variation in a reference level of the sensor data from an expected reference level measured among a plurality of different time periods in a fabrication process.

27. The method according to claim 26, wherein the calculating of the shift offset comprises:

presetting the reference level for wafer data sensed by a sensor;

determining an expected variation of the reference level for the wafer data collected at least one selected set of equipment according to an amount of time that elapses;

collecting the wafer data during the fabrication process at a specified time and determining whether the reference level for the wafer data collected at the specified time matches the expected variation in the reference level for the specified time; and determining whether to update the expected variation according to a difference between the reference level for the wafer data collected at the specified time and the preset reference level and the expected variation at the specified time.

28. The method according to claim 27, wherein the expected variation depends on at least one of: elapsed driving time of the at least one selected set of equipment, an RF time, and a number of wafers processed by the at least one selected set of equipment.

29. The method according to claim 27, wherein the at least one selected set of equipment includes a plurality of selected sets of equipment, and the method further comprises:

storing a plurality of expected variations to correspond to a plurality of specified times and the plurality of selected sets of equipment in a table.

30. The method according to claim 22, wherein the calculating of the shift offset comprises:

providing a plurality of shift offset values for the sensor data corresponding to a plurality of time slots of a semiconductor fabrication process;

collecting current sensor data from a sensor that senses one or more wafers processed by at least one set of equipment at a specified time;

calculating a shift offset of the current sensor data and comparing the shift offset of the current sensor data with the shift offset of one or more time slots that correspond to the specified time to determine whether the shift offset of the current sensor data matches the shift offset of the one or more time slots that correspond to the specified time; and updating the shift offsets of the one or more time slots that correspond to the specified time if the shift offset of the current sensor data does not match the shift offsets of the one or more time slots that correspond to the specified time.

31. The method according to claim 22, wherein the calculating of the drift offset comprises:

creating predetermined pattern information from initial sensor data sensed for a plurality of wafers processed by a plurality of identical sets of equipment and collected by at least one sensor;

collecting current sensor data for the plurality of wafers being processed by at least one set of equipment and creating sensed pattern information;

performing a preliminary evaluation of the current sensor data by determining whether the sensed pattern information matches the predetermined pattern information; and calculating the drift offset of the current sensor data and comparing the drift offset of the current sensor data to a preset drift offset range, passing the current sensor data when either the drift offset of the current sensor data falls within the preset drift offset range or the sensed pattern information matches the predetermined pattern information, and rejecting the current sensor data when the drift offset of the current sensor data does not fall within the preset drift offset range and the sensed pattern information does not match the predetermined pattern information.

32. The method according to claim 31, wherein the predetermined pattern information includes a drift managing range and the performing of the preliminary evaluation comprises determining whether the current sensor data falls within the drift managing range of the predetermined pattern information.

33. The method according to claim 32, wherein the preliminary evaluation is performed for a plurality of current sensor data values that correspond to a plurality of predetermined data values and the drift managing range comprises a deviation from the plurality of predetermined data values.

34. The method according to claim 32, wherein the creating of the predetermined pattern information including the drift managing range from the initial sensor data sensed for the plurality of wafers comprises:
- sensing the initial data from the plurality of wafers processed by the plurality of identical sets of equipment;
- determining sample points to correspond to one or more of the plurality of wafers processed by the plurality of identical sets of equipment;
- determining an average value of each of the plurality of sample points and determining a standard deviation at each of the plurality of sample points; and
- creating the drift managing range from each of the standard deviations of the plurality of sample points.

35. The method according to claim 34, wherein the calculating of the drift offset of the current sensor data comprises:
- determining a plurality of representative data values of the current sensor data that correspond to each of the plurality of sample points; and
- determining a deviation between the plurality of representative values of the current sensor data and the average values at each of the plurality of sample points.

36. An apparatus to compensate sensor data used in an interlock system, comprising:
- an interlock setting part to set a drift upper limit and a drift lower limit;
- a sensor to create sensor pattern information about sensor data of a plurality of sets of equipment performing manufacturing processes on a corresponding plurality of predetermined units;
- a drift offset manager to create reference pattern information about a reference model, to determine whether the sensor pattern information satisfies the drift upper limit and the drift lower limit; and
- a data processor to calculate a drift offset according to the reference pattern information and the sensor pattern information when the sensor pattern information satisfies the drift upper limit and the drift lower limit,
- wherein the drift offset manager compensates the sensor data according to the calculated drift offset, and the drift offset includes an offset value for each of the sets of equipment as measured from the predetermined units being processed thereby.

37. The apparatus according to claim 36, wherein the sensor pattern information includes sensor data for a plurality of identical sets of equipment performing a plurality of different processes on a plurality of wafers, and the drift offset includes an offset value for each of the plurality of identical sets of equipment as measured from the plurality of wafers being processed thereby.

38. The apparatus according to claim 36, further comprising:
- a shift offset manager to calculate a shift offset according to the sensor data and to compensate the sensor data according to the calculated shift offset; and
- an interlock determiner to determine whether an interlock is generated according to the compensated sensor data and the calculated drift offset.

39. An apparatus to compensate sensor data from a selected sensor used in an interlock system, comprising:
- a sensor selected for compensation to collect sensor data during a preventative maintenance cycle that occurs at predetermined times;
- a shift offset manager to cluster the sensor data into a plurality of time slots with respect to a unit of the preventative maintenance cycle and to select one of the plurality of time slots as a reference time slot, and
- a data processor to calculate a shift offset about each of the plurality of time slots with respect to reference data of the reference time slot and data of each of the other ones of the plurality of time slots,
- wherein the shift offset manager compensates the sensor data from the sensor selected for the compensation according to the calculated shift offset.

40. The apparatus according to claim 39, wherein the data processor further calculates a shift offset of a time slot having no sensor data using a regression analysis.

41. The apparatus according to claim 39, further comprising:
- a drift offset manager to calculate a drift offset according to the sensor data; and
- an interlock determiner to determine whether an interlock is generated according to the compensated sensor data and the calculated drift offset.

42. The apparatus according to claim 39, wherein the sensor data represents a state of operation of a set of manufacturing equipment, and the shift offset represents a tendency of the sensor data measured by the sensor from the set of equipment to vary in time with respect to the measured sensor data of the set of manufacturing equipment.

43. An apparatus to compensate sensor data of a sensor in an interlock system having a plurality of sets of equipment, the apparatus comprising:
- a sensor to sense data associated with a selected set of equipment at a predetermined point in time;
- a drift offset manager to monitor a first variation of the sensor data associated with the selected set of equipment with respect to sensor data of other sets of equipment during operation of the plurality of sets of equipment and to compensate the sensor data associated with the selected set of equipment for the first variation; and
- a shift offset manager to monitor a second variation of the sensor data associated with the selected set of equipment with respect to itself over a time interval that is greater than the predetermined point in time and to compensate the sensor data associated with the selected set of equipment at the predetermined point in time for the second variation.

* * * * *